(12) United States Patent
Sigl et al.

(10) Patent No.: US 9,206,865 B2
(45) Date of Patent: Dec. 8, 2015

(54) BRAKE LINING FOR A PARTIALLY LINED DISC BRAKE

(75) Inventors: Christoph Sigl, Neuried (DE); Matthias Niessner, Ismaning (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 176 days.

(21) Appl. No.: 13/695,634

(22) PCT Filed: May 3, 2011

(86) PCT No.: PCT/EP2011/057001
§ 371 (c)(1),
(2), (4) Date: Jan. 17, 2013

(87) PCT Pub. No.: WO2011/138301
PCT Pub. Date: Nov. 10, 2011

(65) Prior Publication Data
US 2013/0105258 A1 May 2, 2013

(30) Foreign Application Priority Data

May 7, 2010 (DE) .......................... 10 2010 019 765

(51) Int. Cl.
*F16D 65/092* (2006.01)

(52) U.S. Cl.
CPC ................... *F16D 65/092* (2013.01)

(58) Field of Classification Search
CPC ............. F16D 65/092; F16D 69/0408; F16D 69/0416; F16D 2069/0433; F16D 2069/0441; B61H 5/00
USPC .......................................... 188/250 B, 250 G
See application file for complete search history.

(56) References Cited

U.S. PATENT DOCUMENTS

| | | | |
|---|---|---|---|
| 2,361,575 A | 10/1944 | Thompson | |
| 2,978,256 A | 4/1961 | Bertsch et al. | |
| 5,409,086 A * | 4/1995 | Themelin et al. | 188/73.37 |
| 5,538,108 A * | 7/1996 | Russo | 188/250 E |

(Continued)

FOREIGN PATENT DOCUMENTS

| | | |
|---|---|---|
| CN | 1333863 A | 1/2002 |
| DE | 196 49 316 A1 | 11/1997 |

(Continued)

OTHER PUBLICATIONS

Notification Concerning Transmittal of International Preliminary Report on Patentability and Written Opinion of the International Search Authority for International Patent Application No. PCT/EP2011/053954, dated Mar. 16, 2011.

(Continued)

*Primary Examiner* — Xuan Lan Nguyen
(74) *Attorney, Agent, or Firm* — Barnes & Thornburg LLP

(57) ABSTRACT

A brake lining for a partially lined disc brake, in particular of a rail vehicle, with lining elements which are connected on a lining carrier and of which each has a carrier plate and friction elements which are fastened to the carrier plate and lie on the rear side in receptacles, wherein the carrier plate is held on the lining carrier such that the carrier plate can be moved in a tilting manner, is configured in such a way that at least one depression which increases the surface area of the carrier plate is provided in the carrier plate, adjacent to the receptacles.

5 Claims, 2 Drawing Sheets

(56) References Cited

U.S. PATENT DOCUMENTS

| | | | |
|---|---|---|---|
| 5,934,418 A * | 8/1999 | Wirth | 188/73.1 |
| 7,051,847 B2 * | 5/2006 | Wirth | 188/250 G |
| 7,661,515 B2 * | 2/2010 | Maehara | 188/250 G |
| 2004/0099493 A1 * | 5/2004 | Himmelsbach et al. | 188/250 B |
| 2008/0047790 A1 * | 2/2008 | Muller et al. | 188/250 B |

FOREIGN PATENT DOCUMENTS

| | | |
|---|---|---|
| DE | 10215170 A1 | 10/2003 |
| DE | 102005034861 A1 | 2/2007 |
| DE | 102008039672 A1 | 2/2010 |
| EP | 0784761 A1 | 7/1997 |
| JP | 57 155 341 U | 9/1982 |
| JP | 11 078 877 A | 3/1999 |

OTHER PUBLICATIONS

English Translation of Notification Concerning Transmittal of International Preliminary Report on Patentability and Written Opinion of the International Search Authority for International Patent Application No. PCT/EP2011/053954, dated Mar. 16, 2011.

Search Report for German Patent Application No. 10 2010 019 765.3; Feb. 14, 2011.

Search Report for International Patent Application No. PCT/EP2011/057001; Nov. 7, 2011.

Chinese Office Action for Application No. 201180022867.1 filed Jun. 26, 2014.

* cited by examiner

BRAKE LINING FOR A PARTIALLY LINED DISC BRAKE

PRIORITY CLAIM

This patent application is a U.S. National Phase of International Patent Application No. PCT/EP2011/057001, filed 3 May 2011, which claims priority to German Patent Application No. 10 2010 019 765.3, filed 7 May 2010, the disclosures of which are incorporated herein by reference in their entirety.

FIELD

Disclosed embodiments relate to a brake lining for a partially lined disk brake.

BACKGROUND

For vehicles, in particular rail vehicles, which reach high speeds, brake linings are used, the friction elements of which are composed of a hard material.

In order to achieve a satisfactory contact pattern, that is to say a uniform surface pressure of the friction elements on the friction face of the brake disk, what is known as an isobaric brake lining is known from EP 0 784 761 B1.

Here, in the contact region with the carrier plate, the friction elements are provided with spherical segment-shaped moldings which rest in dome-shaped receptacles which are adapted to them.

Together with the friction elements which are positioned on it, the carrier plate forms a lining element, of which in turn a plurality are held in a tiltably movable manner in a lining carrier.

In the cited literature which represents the generic prior art, three friction elements are arranged on each carrier plate, which represents a statically defined system.

The particularly satisfactory thermal contact pattern of the brake lining is based on the mobility of the three (in the known construction) friction elements which, as a result, can follow unevennesses which are present on the brake disk.

As a result of, as it were, this three-point mounting, a displacement of the friction elements takes place virtually without a change in the contact pressure which is substantially identical in all friction elements. As a result, a homogeneous contact pattern is produced and local heat spots on the brake disk are avoided.

On account of its high performance, the isobaric brake lining is used predominantly in high speed transport, very pronounced heating of the entire brake lining being produced, however, in the event of a braking operation.

The heating capacity of the system is limited, however, by the achievement of the local strength against deformation of the carrier plate and of the lining carrier, the frictional heat being conducted into the lining carrier via the friction element/carrier plate contact and the carrier plate/lining carrier bearing region.

SUMMARY

Disclosed embodiments provide a brake lining of the generic type in such a way that its ability to be used is improved with low structural and production outlay and its service life is increased.

Disclosed embodiments achieve a situation where a greater radiation area is provided, via which more heat is dissipated to the surroundings.

The dimensions and shape of the depression can be freely selected in principle and are restricted merely by what is technically feasible.

In accordance with at least one disclosed embodiment, a depression is configured in the manner of a ball socket, as it were parallel to the spherical segment-shaped projection, by way of which the carrier plate rests in a tiltably movable manner in an adapted receptacle of the lining carrier.

It is also conceivable to provide the depression with cooling fins or to arrange a plurality of depressions in the manner of a hole pattern, which depressions are then configured in each case as blind holes.

In addition to a round area, the depression can also be of polygonal configuration in outline, with a flat or concavely or convexly curved bottom.

In addition, like the carrier plate, the depression can otherwise be provided with a metallic coating or can be coated with a corrosion protection means. For further improvement of the heat dissipation, that area of the carrier plate which faces the friction elements can be provided with a corresponding layer, at least in the regions which are not covered by the friction elements.

Otherwise, the depression can be configured with regard to its dimensions and design such that it meets the requirements of rigidity of the carrier plate in order to achieve favorable overall compliance of the lining system.

BRIEF DESCRIPTION OF THE FIGURES

In the following text, one exemplary embodiment will be described using the appended drawings, in which.

DETAILED DESCRIPTION

Disclosed embodiments may be distinguished by the fact that it can in principle be realized in a cost-neutral manner. The carrier plate may be produced as a precision cast part, with the result that the depression can also be cast integrally with it. However, it is also conceivable to produce the depression with or without the removal of material, the latter, for example, when the carrier plate is composed of sheet metal and is formed by stamping, drawing or the like.

The greater heat dissipation which results in the case of the novel brake lining leads to a greater load bearing capability, with the result that the novel brake lining is suitable, in particular, for the use in high speed trains. To this extent, the ability of the brake lining to be used is improved.

In comparison with the prior art, the novel brake lining also has a longer service life, which naturally reduces the operating costs to a certainly noticeable degree, which operating costs comprise not only the procurement and installation costs, but also the down times of the vehicle.

Figure 1:
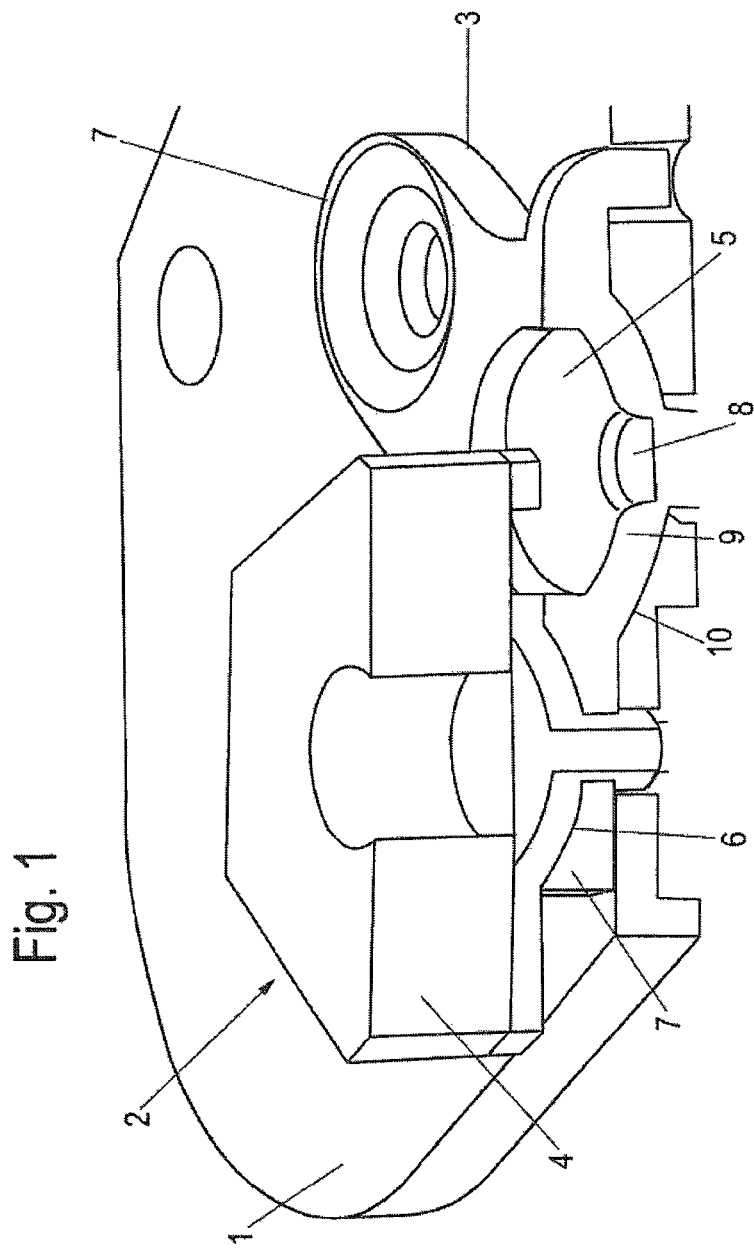
FIG. 1 shows a detail of the brake lining in a perspective view.

FIG. 1 shows a detail of a brake lining for a partially lined disk brake, in particular of a rail vehicle, having a plurality of lining elements 2 which are connected to a lining carrier 1 and of which only one is shown in FIG. 1.

Each lining element 2 has a carrier plate 3 and friction elements 4 which are fastened on said carrier plate 3 and rest on the rear side in receptacles 6 of the carrier plate 3, the receptacle 6 being configured as a dome and that region of the friction element 4 which rests in it being of spherical segment-shaped configuration.

The receptacles 6 are arranged in three limbs 7 of the carrier plate 3 which are at angles with respect to one another.

Figure 2:
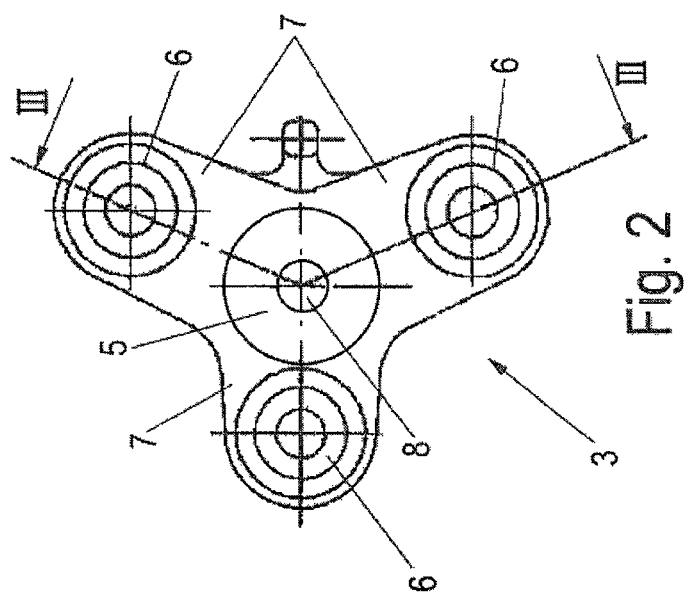
FIG. 2 shows a plan view of a carrier plate.
Figure 3:
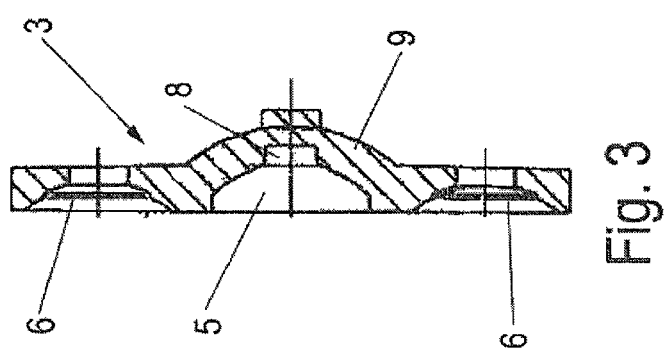
FIG. 3 shows a section through the carrier plate according to the line in FIG. 2.

The carrier plate 3 which is shown as a detail in FIGS. 2 and 3 is held in a tiltably movable manner on the lining carrier 1, to which end the carrier plate 3 has a spherical segment-shaped projection 9 which rests in a ball socket 10 of the lining carrier 1.

At least one depression 5, which increases the surface area of the carrier plate 3 may be provided, adjacently to the receptacles 6, in the carrier plate 3 which is configured as a cast part, which depression 5, in the present exemplary embodiment, is configured spherically and concentrically with respect to the projection 9, with a central hole 8 in the manner of a blind hole. Here, the depression 5 and the hole 8 may be introduced during casting and may be positioned in the region of congruence of the projection 9.

The course of the curvature of the depression 5 corresponds substantially to that of the curvature of the projection 9.

The invention claimed is:

1. A brake lining for a partially lined disk brake, the brake lining comprising:
   a plurality of lining elements; and
   a lining carrier connected to each of the plurality of lining elements, wherein each of the plurality of lining elements has a carrier plate and friction elements,
   wherein the friction elements are fastened on to their respective carrier plate and rest on a rear side of the carrier plate in receptacles,
   wherein the carrier plate is held in a tiltably movable manner on the lining carrier,
   wherein the carrier plate has a spherical segment-shaped projection which rests in a ball socket of the lining carrier,
   wherein at least one depression which increases the surface area of the carrier plate is provided in the carrier plate adjacent to the receptacles,
   wherein the depression is of a round area or of polygonal configuration in outline, with a flat or curved bottom, and
   wherein the depression is configured spherically and concentrically with respect to the projection on an opposite side of the carrier plate from where the projection is provided,
   wherein the depression includes a central hole, wherein the depression and the hole are introduced during casting and positioned in a region of congruence of the projection, wherein a course of curvature of the depression corresponds substantially to that of the curvature of the projection,
   wherein the at least one depression is one of a plurality of depressions which are configured as blind holes.

2. The brake lining of claim 1, wherein the at least one depression is provided with a coating for at least one of corrosion protection and heat dissipation.

3. The brake lining of claim 1, wherein the carrier plate is configured as a cast part with the at least one depression cast integrally with the carrier plate.

4. The brake lining of claim 1, wherein the at least one depression is made with or without the removal of material.

5. The brake lining of claim 1, in combination with a rail vehicle.

* * * * *